No. 780,452. PATENTED JAN. 17, 1905.
W. STRUCK.
PNEUMATIC TIRE.
APPLICATION FILED APR. 8, 1904.
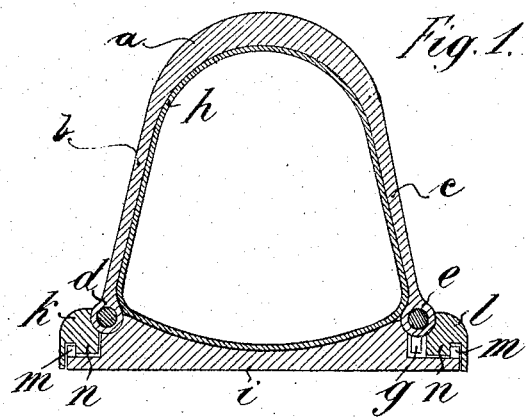
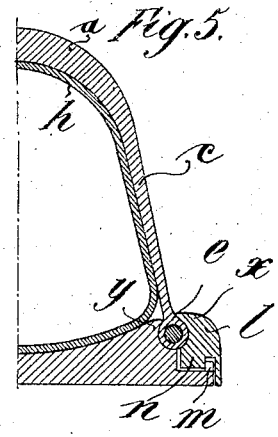
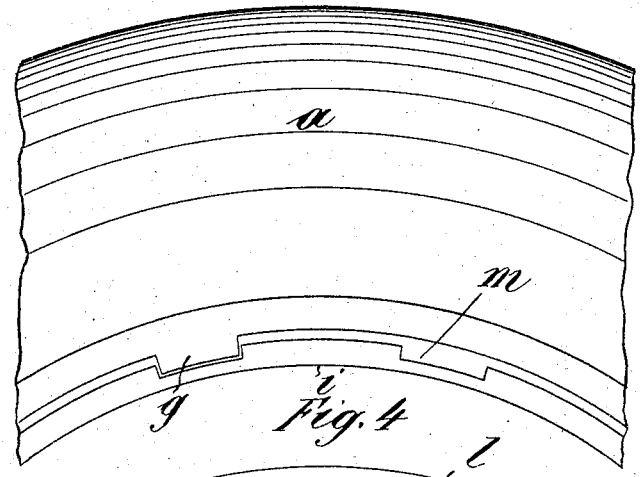
Witnesses.
Jno. R. Adams
O. Knight, Jr.
Inventor
Wilhelm Struck.
By Knight Bros
attys No. 780,452.

Patented January 17, 1905.

UNITED STATES PATENT OFFICE.

WILHELM STRUCK, OF FRIEDENAU, NEAR BERLIN, GERMANY, ASSIGNOR TO B. POLACK, OF WALTERSHAUSEN, THURINGEN, GERMANY.

PNEUMATIC TIRE.

SPECIFICATION forming part of Letters Patent No. 780,452, dated January 17, 1905.

Application filed April 8, 1904. Serial No. 202,225.

*To all whom it may concern:*

Be it known that I, WILHELM STRUCK, a citizen of the free town of Hamburg, and a resident of 12 Illstrasse, Friedenau, near Berlin, Germany, have invented certain new and useful Improvements in Pneumatic Tires, of which the following is a specification.

The present invention relates to pneumatic tires, and especially to the kind having flexible but inextensible cover edges and removable felly-rims; and the object of my invention is to provide improved means for securing the cover to the felly. I attain the said objects by providing in the felly channels having overhanging side walls and in which the reinforced edges of the cover rest, and for the purpose of preventing movement of the cover within the channel I further provide a tongue-and-groove connection between the edges of the cover and the walls of the channels.

My invention is illustrated in the annexed drawings, in which—

Figure 1 is a vertical section of my improved tire. Fig. 2 shows a part of the felly. Fig. 3 shows a part of the felly and the cover. Fig. 4 is a part of the felly with the removable rims seen from the interior. Fig. 5 is a detail view of a slightly-modified form of construction.

The tire consists of the air-tube $h$ and the cover $a$, of which the flanges $b$ and $c$ terminate in reinforced edges $d$ and $e$, that are flexible but inextensible.

The felly consists of the base $i$ and the two rims $k$ and $l$, provided with downwardly-extending projections $n$, which engage circumferential grooves in the felly. The projecting edges $s$ of the felly are provided with openings $m$, through which the projections $n$ of the rims can pass to rest in the grooves of the felly and when turned a little engage the edges $s$. The parts $k$, $i$, and $l$ are grooved, so as to receive the edges $d$ and $e$ of the cover $a$, and when the rims are placed on the tire the edges are held securely in place. Each of the rims $k$ and $l$ may be in one piece or each may consist of several pieces.

In order to prevent the edges from moving within the channel of the felly, the edges $d$ and $e$ may be provided with tongues $g$, (see Figs. 1 and 3,) engaging grooves $r$ in the felly-base $i$. The base $i$ and the rims $k$ and $l$ may be grooved in such a manner so as to form claws $x$ and $y$, engaging a greater part of the edges $e$ and $d$. (See Fig. 5.) The rims $k$ and $l$ may be held more firmly to the felly by means of any suitable fastening device.

When it is desired to secure the parts together, the rims $k$ and $l$ are removed and the air-tube $h$, with the cover $a$, is placed on the felly. Thereupon the projections $n$ of the rims $k$ and $l$ are inserted through the openings $m$ and turned a little, so as to interlock with the edge $s$ of the felly, and the edges $d$ and $e$ are thus held securely within the channel formed by the grooves of the base $i$ and rims $k$ and $l$.

Having described my invention, what I claim is—

1. In a pneumatic tire, the combination with an air-tube and a cover having reinforced edges, said edges being flexible but inextensible, of a felly, tongue-and-groove connections between said edges and said felly, removable rims on said felly, said felly and said rims having grooves forming when the rims are secured on the felly a channel the walls of which overlap the edges of the cover, and means for securing the rims on the felly.

2. In a pneumatic tire, the combination with an air-tube and a cover having reinforced edges, said edges being flexible but inextensible, of a felly, removable rims, said felly and said rims having grooves adapted to receive the cover edges, and interlocking tongue-and-groove connections between said felly and said rims.

The foregoing specification signed at Berlin, Germany, this 23d day January, 1904.

WILHELM STRUCK.

In presence of—
WOLDEMAR HAUPT,
HENRY HASPER.